(12) United States Patent
Ishikawa

(10) Patent No.: US 6,212,000 B1
(45) Date of Patent: Apr. 3, 2001

(54) TWO-WAY OPTICAL AMPLIFIER MODULE

(75) Inventor: Yukiko Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/229,613

(22) Filed: Jan. 13, 1999

(30) Foreign Application Priority Data

Jan. 14, 1998 (JP) .................................................. 10-020338

(51) Int. Cl.$^7$ ...................................................... H01S 3/00
(52) U.S. Cl. .......................................... 359/341; 359/124
(58) Field of Search ...................................... 359/341, 124

(56) References Cited

U.S. PATENT DOCUMENTS

| | | | | |
|---|---|---|---|---|
| 5,633,741 | * | 5/1997 | Giles | 359/124 |
| 5,742,416 | * | 4/1998 | Mizrahi | 359/134 |
| 5,812,306 | * | 9/1998 | Mizrahi | 359/341 |
| 5,887,091 | * | 3/1999 | Jabr et al. | 385/24 |

FOREIGN PATENT DOCUMENTS

| | | |
|---|---|---|
| 2-281774 | 11/1990 | (JP) . |
| 3-194518 | 8/1991 | (JP) . |
| 4-29464 | 1/1992 | (JP) . |
| 4-62528 | 2/1992 | (JP) . |
| 5-224253 | 9/1993 | (JP) . |
| 5-227102 | 9/1993 | (JP) . |
| 6-69579 | 3/1994 | (JP) . |
| 6-310791 | 11/1994 | (JP) . |
| 9-18417 | 1/1997 | (JP) . |
| 9-5806 | 1/1997 | (JP) . |

OTHER PUBLICATIONS

Japanese Office Action dated Sep. 28, 1999, with partial translation.

* cited by examiner

Primary Examiner—Mark Hellner
(74) Attorney, Agent, or Firm—McGinn & Gibb, PLLC

(57) ABSTRACT

A two-way optical amplifying module directs an upward signal light into an optical amplifier through a first optical circulator and a first Wavelenght Division Multiplexer (WDM), and amplifies by exciting light sent from a light source through the first WDM. The exciting light excites an erbium-doped fiber to amplify the upward signal light, following which the amplified upward signal light passes through a second WDM and circulates within a second optical circulator where ASE (Amplified Spontaneous Emission) is eliminated by a reflecting bandpass filter during circulation, and transmitted from an output port. A downward signal light is directed to the optical amplifier through the second optical circulator and the second WDM. Exciting light sent from another light source is directed into the optical amplifier through the second WDM to excite the erbium-doped fiber of the optical amplifier so that the downward signal light is amplified, following which the amplified downward signal light passes through the first WDM and flows into the second optical circulator to circulate within the first optical circulator where ASE is removed by reflecting a second bandpass filter, and finally transmitted from another output port.

18 Claims, 3 Drawing Sheets

TWO-WAY OPTICAL AMPLIFIER MODULE

BACKGROUND OF THE INVENTION

1. Field of the Invention

The present invention relates to a two-way optical amplifier module capable of amplifying two-way signal light, i.e., upward (in the direction of higher hierarchy node) and downward signal light, in a single optical amplifier.

2. Description of the Related Art

Optical components such as isolators and EDF (Erbium-Doped Fiber, hereinbelow abbreviated as "Er") are usually necessary on both the upward transmission path and downward. transmission path when transmitting and amplifying two-way signal light, i.e., upward signal light and downward signal light, and this requirement has prevented both reduction in size and reduction of costs.

The large number of parts further contributes to the problems of deterioration due to insertion loss in the signal light as well as deterioration of NF (Noise Figure) due to insertion loss in preceding sections.

There have been a number of proposals regarding this type of two-way optical communication. In Japanese Patent Laid-open No. 294646/92 for example, an optical multiplexer and optical demultiplexer are provided at both the preceding section and following section of an optical amplifier, a first optical isolator is provided at the amplifier for upward signal light, and a second optical isolator and optical filter are provided at the amplifier for downward signal light.

Alternatively, Japanese Patent Laid-open No. 224253/93 discloses a case in which optical multiplexers and optical demultiplexers are provided at both the preceding section and following section of an optical amplifier, optical isolators are provided on the transmission paths (by means of optical fiber) that are divided by the optical demultiplexers, and signal light is multiplexed by the optical multiplexers and used as one transmission path.

In the case of these publications, however, the use of three components, i.e., the optical isolators, optical multiplexers, and optical demultiplexers, at the preceding section of the optical amplifier results in a large loss at the input section and a deterioration in noise figure.

In this regard, a reduction of insertion loss can be achieved by reducing the number of components in the input section to either an optical circulator and optical multiplexer or a first optical circulator.

In the above-described prior art, the overall insertion loss is inevitably great because signal light passes through a total of eight components.

A reduction in the number of components, and a resulting reduction in insertion loss and reduction in size, can be achieved by replacing the optical isolators, optical multiplexers, and optical demultiplexers with optical circulators.

As for the technology for realizing upward signal light/downward signal light two-way communication using a single optical amplifier, Japanese Patent Laid-open No. 194518/91 discloses a case in which signal light is received and transmitted through rare-earth element-added optical fibers using optical circulators, reflected light being passed through the optical circulators and radiated to the outside so as not to return to the rare-earth element-added optical fibers; and Japanese Patent Laid-open No. 69579/94 discloses a case in which exciting light together with signal light is received by way of an optical circulator to the first port of an optical coupler and there split into two branches, each branch is supplied from the second and third ports of the optical coupler to first and second terminals of optical amplifying medium, the branches of signal light supplied to the first and second terminals of the optical amplifying medium are directed in mutually differing directions within the optical amplifying medium, and an optical amplifying effect is realized by means of stimulated emission.

Finally, Japanese Patent Laid-open No. 5806/97 discloses an optical amplifier that effects two-way communication wherein, in order to reduce the number of components and accompanying loss, exciting light is supplied to a rare earth-added optical fiber by way of an optical circulator, which has a forward transfer characteristic in the direction of first terminal to third terminal and in which the rare earth-added fiber is connected to the second terminal and a signal light output terminal is connected to the third terminal, and the signal light amplified by the rare-earth-added fiber and transmitted from the signal light output terminal.

All of the cases of the prior art disclosed in the above-described publications, however, still leave room for reduction of the number of components, as already described. In addition, the examples of the prior art cannot be considered satisfactory from the viewpoint of insertion loss and NF deterioration; nor can they be considered satisfactory from the standpoint of reduction of size and costs.

SUMMARY OF THE INVENTION

The present invention was achieved with the aim of solving the above-described problems of the prior art and has the object of providing a two-way optical amplifier module that can reduce insertion loss and NF deterioration by reducing the number of parts, and that further allows a reduction in size and cost.

To achieve the above-described objects, the two-way optical amplifier module of this invention is provided with: an optical amplifier constituted by optical fiber doped with a rare-earth element such as erbium as the active material for amplifying upward signal light and downward signal light, a first optical circulator for both transmitting upward signal light to the optical amplifier and outputting the downward signal light amplified by the optical amplifier, a second optical circulator for both transmitting the downward signal light to the optical amplifier and outputting the upward signal light amplified by the optical amplifier, a first light source for supplying exciting light to the optical amplifier for amplification of the upward signal light, a second light source for supplying exciting light to the optical amplifier for amplification of the downward signal light, a first reflecting bandpass filter for eliminating ASE (Amplifier Spontaneous Emission) during passage of the upward signal light amplified by the optical amplifier through the second optical circulator and outputting only the upward signal light component, and a second reflecting bandpass filter for eliminating ASE during passage of downward signal light amplified by the optical amplifier through the first optical circulator and outputting only the downward signal light component.

According to this invention, upward signal light incident to the first optical circulator and exciting light from the first light source are directed into an optical amplifier, the rare-earth active material of the optical amplifier is excited by the exciting light to amplify the upward signal light by stimulated emission, this amplified upward signal light is directed to the second optical circulator, ASE is eliminated by the first reflecting bandpass filter during passage through the second optical circulator, and only upward signal light is outputted from the second optical circulator.

Downward signal light is directed from the second optical circulator into the optical amplifier and exciting light from the second light source is directed to the optical amplifier, the rare-earth active material of the optical amplifier is excited by this exciting light to amplify the downward signal light by stimulated emission, ASE is eliminated by the second reflecting bandpass filter during passage through the first optical circulator, and only the downward signal light is outputted from the first optical circulator.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

Explanation is next presented regarding embodiments of the two-way optical amplifier module of this invention referring to the accompanying figures. For the sake of convenience in the explanations of each of the embodiments of this invention, upward signal light is transmitted from the left to the right of the figures, and downward signal light is transmitted from the right to the left side of the figures.

Figure 1:
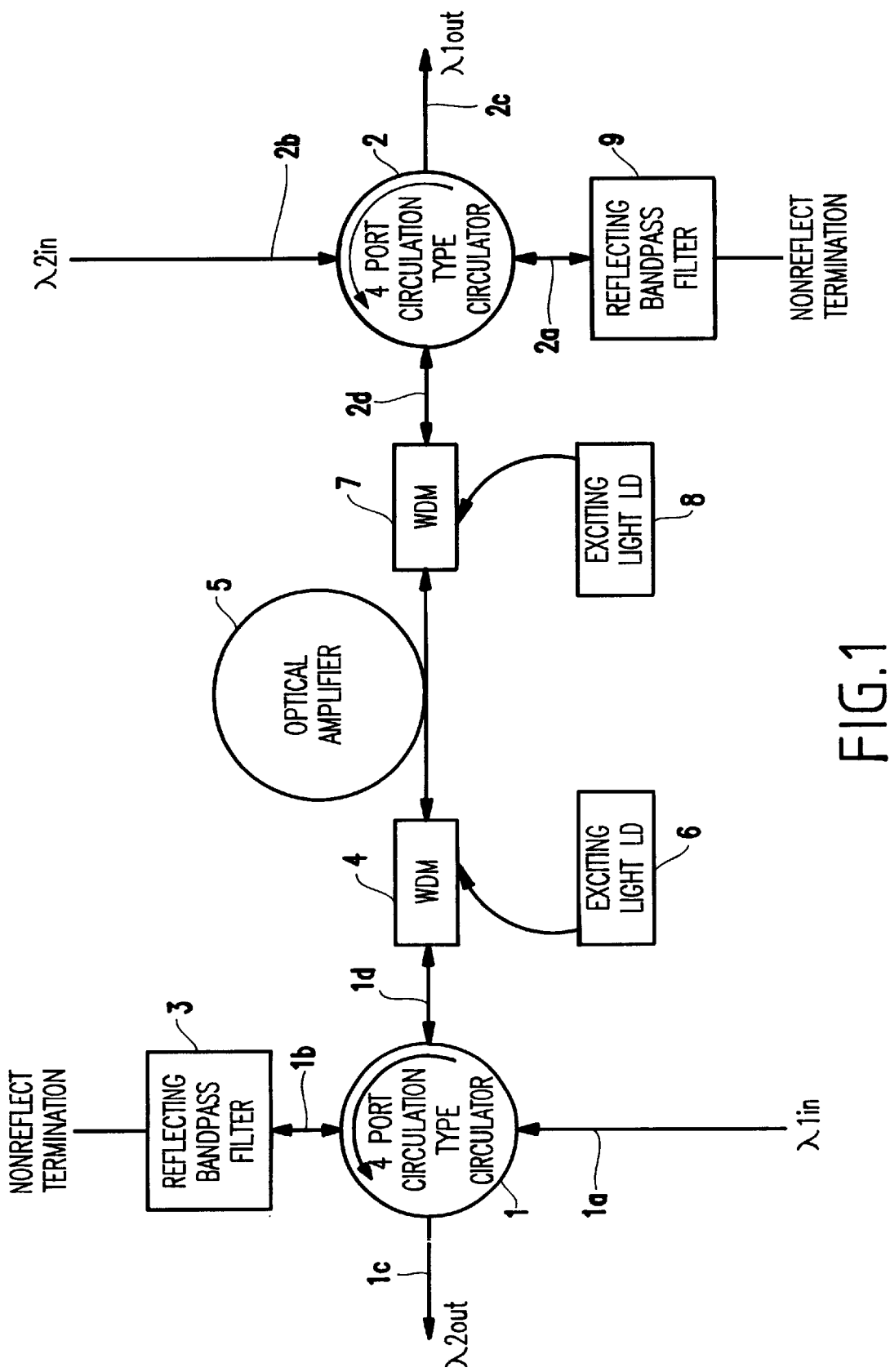
FIG. 1 is a block diagram showing the construction of the first embodiment of the two-way optical amplifier module according to the present invention.

FIG. 1 is a block diagram showing the construction of the first embodiment of the present invention. The first embodiment shown in this FIG. 1 allows signal light amplification of both upward signal light and downward signal light by a single optical amplifier.

In FIG. 1, first optical circulator 1 and second optical circulator 2 both have four ports. Upward signal light $\lambda 1$ having a wavelength of, for example, 1550 nm, is incident from port 1a, and one terminal of second reflecting bandpass filter 3 is connected to port 1b of first optical circulator 1. The other terminal of this second reflecting bandpass filter 3 has reflectionless termination.

Second reflecting bandpass filter 3 is a filter for eliminating ASE includes in the downward signal light during passage of the downward signal light through first optical circulator 1.

The downward signal light, to be explained hereinbelow, is outputted from port 1c of first optical circulator 1.

Port 1d of this first optical circulator 1 is connected to optical amplifier 5 by way of WDM 4 (Wavelength Division Multiplexer).

Exciting light from light source 6 constituted by, for example, a laser diode, is directed to optical amplifier 5 by way of this WDM 4.

Optical amplifier 5 is connected to port 2d of second optical circulator 2 by way of WDM 7. Exciting light from light source 8 constituted by, for example, a laser diode, is supplied to optical amplifier 5 by way of this WDM 7.

A transmission path is thus formed for upward signal light $\lambda 1$ by first optical circulator 1-WDM 4-optical amplifier 5-WDM 7-second optical circulator 2. Upward signal light $\lambda 1$ is transmitted from port 2c of this second optical circulator 2.

Downward signal light $\lambda 2$ is received from port 2b of second optical circulator 2. This downward signal light $\lambda 2$ has a wavelength of 1555 nm, which differs from the wavelength of the upward signal light $\lambda 1$.

Port 2a of second optical circulator 2 is connected to one terminal of first reflecting bandpass filter 9, and the other terminal of this first reflecting bandpass filter 9 has reflectionless termination.

First reflecting bandpass filter 9 eliminates ASE during passage of upward signal light $\lambda 1$ through second optical circulator 2 and allows only upward signal light $\lambda 1$ to be transmitted from port 2c.

A downward transmission path is thus formed by port 2b-second optical circulator 2-WDM 7-optical amplifier 5-WDM 4-first optical circulator 1-port 1c.

Explanation is next presented regarding the operation of the first embodiment configured according to the foregoing description.

Upward signal light $\lambda 1$ having a wavelength of 1550 nm that is incident from port 1a of first optical circulator 1 passes through first optical circulator 1 and is directed to optical amplifier 5 by way of WDM 4.

In addition, exciting light from light source 6 is incident to optical amplifier 5 by way of this WDM 4. This exciting light excites the Er (Erbium doped fiber) of optical amplifier 5, upward signal light $\lambda 1$ is amplified by the stimulated emission of the excited Er, and upward signal light $\lambda 1$ is then directed through WDM 7 to second optical circulator 2 from port 2d of second optical circulator 2.

At this time, ASE of spontaneous emission light that is radiated from optical amplifier 5 and that is included in upward signal light $\lambda 1$ passes through WDM 7, passes from port 2d and by way of port 2a of second optical circulator 2, and is eliminated by first reflecting bandpass filter 9.

This first reflecting bandpass filter 9 reflects light of a specific wavelength, whereby only the signal of the necessary wavelength, i.e., upward signal light $\lambda 1$, is extracted from port 2c.

Because the wavelength of upward signal light $\lambda 1$ in this case is 1550 nm as described hereinabove, an optical fiber grating that reflects only a wavelength of 1550 nm is employed as first reflecting bandpass filter 9.

Explanation is next presented regarding the transmission system for downward signal light $\lambda 2$.

Downward signal light $\lambda 2$ is incident from port 2b of second optical circulator 2, passes through second optical circulator 2, passes from port 2d and through WDM 7, and is directed to optical amplifier 5.

At this time, exciting light from light source 8 is directed through WDM 7 to optical amplifier 5. The Er of optical amplifier 5 is thus excited by the incidence of exciting light and downward signal light $\lambda 2$ is amplified by the stimulated emission of the Er.

This amplified downward signal light $\lambda 2$ is directed through WDM 4 and into first optical circulator 1 from port 1d of first optical circulator 1.

At this time, the ASE of spontaneous emission light that is radiated from optical amplifier 5 and that is contained in downward signal light $\lambda 2$ passes through WDM 4, passes from port 1d and through port 1b of first optical circulator 1, and is eliminated by second reflecting bandpass filter 3.

Because the wavelength of downward signal light λ2 is 1555 nm, an optical fiber grating that reflects only a wavelength of 1555 nm is used as second reflecting bandpass filter 3.

Downward signal light λ2 from which ASE has been eliminated is thus extracted from port 1c of first optical circulator 1.

The signal light insertion loss of the optical fiber gratings used as the above-described first reflecting bandpass filter 9 and second reflecting bandpass filter 3 is 0.5 dB, and the half width of the reflection region is 2 nm.

The transmitted wavelength loss of the optical fiber grating for light other than the signal light is 30 dB, and the ASE level thus decreases by 30 dB.

The above-described first embodiment has the advantage of allowing output of only upward signal light λ1 and downward signal light λ2 by eliminating unnecessary spontaneous emission light from optical amplifier 5 using first reflecting bandpass filter 9 and second reflecting bandpass filter 3 attached to the optical circulator on the following section side, i.e., second optical circulator 2 and first optical circulator 1, respectively, on both the upward signal light path and the downward signal light path.

In addition, the use of two optical components on each input unit, i.e., first optical circulator 1 and WDM 4 on one side and second optical circulator 2 and WDM 7 on the other, enables a reduction in insertion loss.

The optical isolators, optical multiplexers, and optical demultiplexers used in the prior art are thus replaced by optical circulators, thereby enabling a reduction in the number of optical components and a decrease in insertion loss. The invention further enables a reduction in size and cost through this reduction in the number of components.

Explanation is next presented regarding the second embodiment of the present invention.

Figure 2:
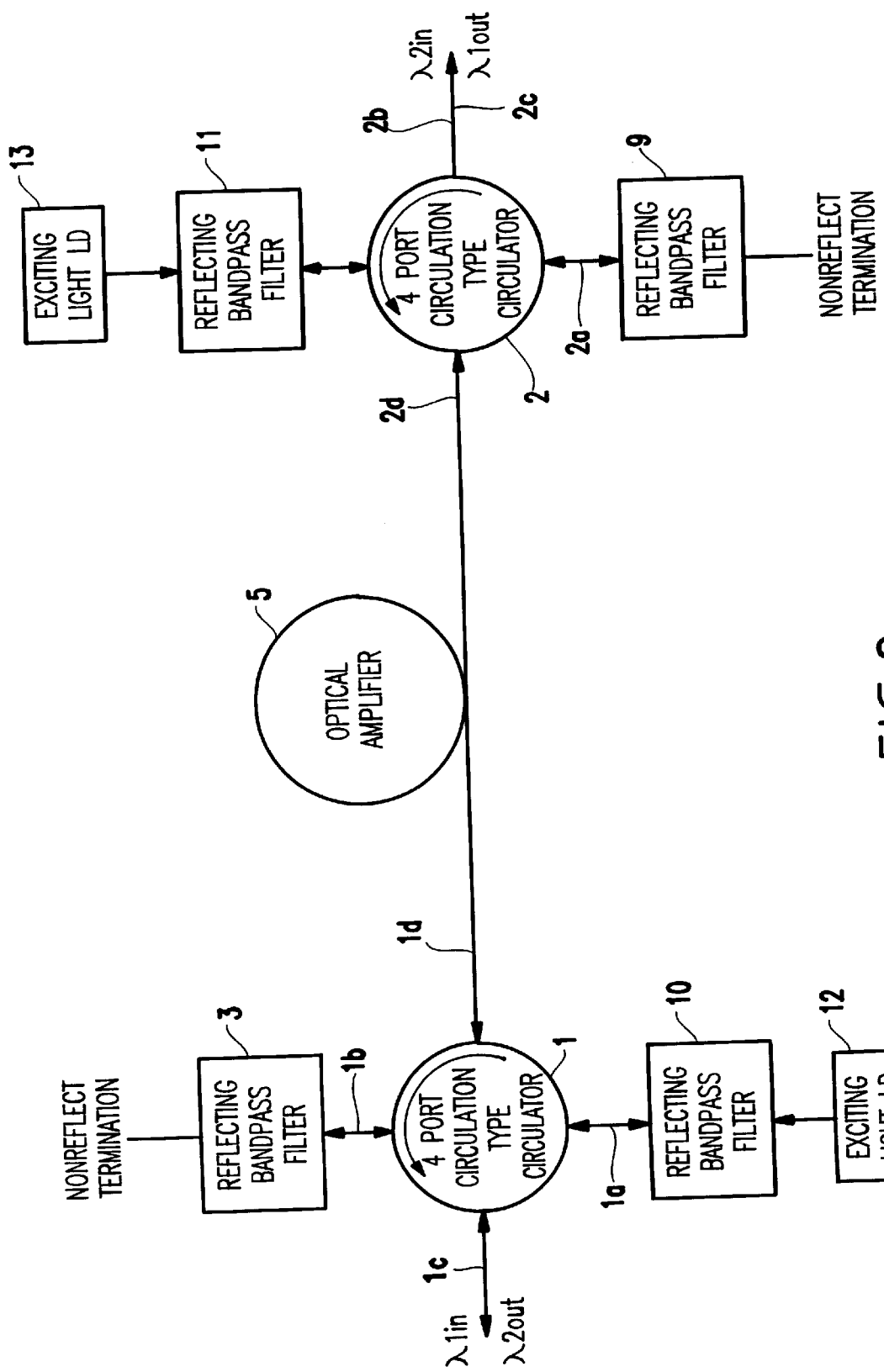
FIG. 2 is a block diagram showing the construction of the second embodiment of the two-way optical amplifier module according to the present invention.

FIG. 2 is a block diagram showing the construction of the second embodiment.

Components in FIG. 2 that are equivalent to those of FIG. 1 are identified by the same reference numerals. Explanation focuses on parts that differ, and redundant explanation is avoided.

As can be clearly seen by comparing FIG. 2 with FIG. 1, WDM 4 and 7 of FIG. 1 are eliminated in FIG. 2; and reflecting bandpass filters 10 and 11 as well as light sources 12 and 13 are newly provided in place of light sources 6 and 8.

Reflecting bandpass filter 10 is connected to port 1a of first optical circulator 1, and light source 12 is connected to this reflecting bandpass filter 10.

Similarly, reflecting bandpass filter 11 is connected to port 2b of second optical circulator 2, and light source 13 is connected to this reflecting bandpass filter 11. The construction is otherwise equivalent to that of FIG. 1.

With these changes to the configuration, upward signal light λ1 is incident to, and downward signal light λ2 is also transmitted from, port 1c of first optical circulator 1.

Similarly, upward signal light λ1 is outputted from, and downward signal light λ2 is incident to, port 2c of second optical circulator 2.

Optical fiber gratings that reflect only a wavelength of 1555 nm are used as second reflecting bandpass filter 3 and reflecting bandpass filter 11.

Explanation is next presented regarding the operation of second embodiment shown in FIG. 2.

Upward signal light λ1 having a wavelength of 1550 nm that is incident from port 1c of first optical circulator 1 is reflected by reflecting bandpass filter 10, which is connected to port 1a of first optical circulator 1 and which reflects only a specific wavelength (1550 nm), and the upward signal light λ1 is then directed to optical amplifier 5 by way of port 1d.

During transmission of this upward signal light λ1, the exciting light of light source 12 passes through reflecting bandpass filter 10, and is directed to optical amplifier 5 by way of port 1d of first optical circulator 1.

This exciting light excites the Er of optical amplifier 5, and upward signal light λ1 is thus amplified by the stimulated emission and then directed from optical amplifier 5 to second optical circulator 2 by way of port 2d of second optical circulator 2.

The ASE included in upward signal light λ1 that has been amplified by optical amplifier 5 is eliminated by first reflecting bandpass filter 9, which is connected to port 2a of second optical circulator 2.

First reflecting bandpass filter 9 reflects only a specific wavelength, whereby only upward signal light λ1 is outputted from port 2c.

In this case, optical fiber gratings that reflect only a wavelength of 1550 nm are used as first reflecting bandpass filter 9 and reflecting bandpass filter 10.

Explanation is next presented regarding the operation of the transmission path of downward signal light λ2.

Downward signal light λ2, which has a wavelength of 1555 nm and which is incident from port 2c of second optical circulator 2, is directed into this second optical circulator 2, is reflected by reflecting bandpass filter 11, which is connected to port 2b of second optical circulator 2 and which reflects only a specific wavelength, and is finally directed to optical amplifier 5 by way of port 2d.

In this case, the wavelength of downward signal light λ2 is 1555 nm, and reflecting bandpass filter 11, therefore reflects a wavelength of 1555 nm.

When this downward signal light λ2 is directed into optical amplifier 5, exciting light from light source 13 is also directed to optical amplifier 5 by way of reflecting bandpass filter 11, port 2b, second optical circulator 2, and port 2d.

This exciting light excites the Er of optical amplifier 5, downward signal light λ2 is amplified by stimulated emission, and the downward signal light λ2 is directed from optical amplifier 5 to first optical circulator 1 by way of port 1d.

The ASE included in downward signal light λ2 when amplified by optical amplifier 5 is hereupon eliminated by second reflecting bandpass filter 3, which is connected to port 1b of first optical circulator 1.

Only the necessary component of downward signal light λ2 from which ASE has been eliminated is extracted from port 1c of first optical circulator 1.

The signal light insertion loss of the optical fiber gratings used as first reflecting bandpass filter 9, second reflecting bandpass filter 3, and reflecting bandpass filters 10 and 11 is 0.5 dB, and the ASE level therefore falls 30 dB.

In addition to the effect of the first embodiment, the second embodiment further enables a reduction in both size and insertion loss by eliminating WDM 4 and 7 and connecting light sources 12 and 13 to first optical circulator 1 and second optical circulator 2 respectively, by way of reflecting bandpass filters 10 and 11, respectively.

Figure 3:
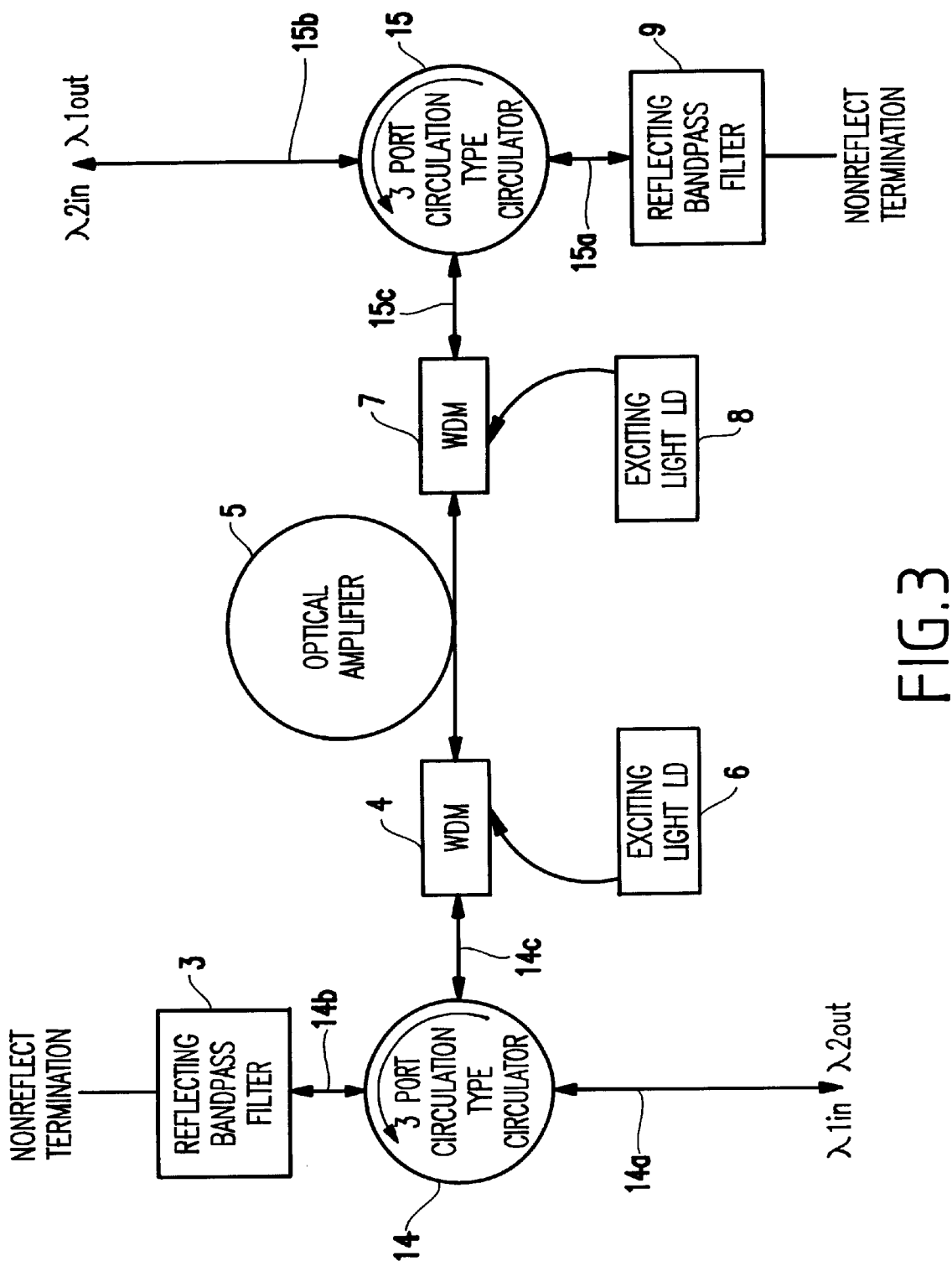
FIG. 3 is a block diagram showing the construction of the third embodiment of the two-way optical amplifier module according to the present invention.

Explanation is next presented regarding the third embodiment of the present invention with reference to the block diagram of FIG. 3. In FIG. 3 as well, components equivalent to those of FIG. 1 are identified by the same reference numerals.

In the third embodiment, first optical circulator 1 and second optical circulator 2 are replaced by three-port circulation type circulators 14 and 15, respectively.

Upward signal light λ1 is incident to, and downward signal light λ2 is transmitted from, port 14a of three-port circulation type circulator 14.

Second reflecting bandpass filter 3 is connected to port 14b of three-port circulation type circulator 14, this second reflecting bandpass filter 3 being provided for eliminating ASE contained in downward signal light λ2.

Port 14c of three-port circulation type circulator 14 is connected to optical amplifier 5 by way of WDM 4.

As in the first embodiment, exciting light from light source 6 passes through the branched port of WDM 4 and is supplied to optical amplifier 5.

Downward signal light λ2 is incident to, and upward signal light λ1 is extracted from, port 15b of three-port circulation type circulator 15.

First reflecting bandpass filter 9 is connected to port 15a of three-port circulation type circulator 15, and port 15c of three-port circulation type circulator 15 is connected to optical amplifier 5 by way of WDM 7.

During passage of downward signal light λ2, exciting light from light source 8 passes through the branched port of WDM 7 and is supplied to optical amplifier 5.

The terminals of second reflecting bandpass filter 3 and first reflecting bandpass filter 9 that are not connected to port 14b and 15a, respectively, have reflectionless termination.

Explanation is next presented regarding the operation of the third embodiment.

When upward signal light λ1 having a wavelength of 1550 nm is first directed to port 14a of three-port circulation type circulator 14, this upward signal light λ1 circulates around three-port circulation type circulator 14 from port 14a, and is transmitted from port 14c to optical amplifier 5 by way of WDM 4.

When this upward signal light λ1 is transmitted, exciting light from light source 6 is supplied to optical amplifier 5 from the branched port of WDM 4, the Er of optical amplifier 5 is excited, and upward signal light λ1 is amplified by the stimulated emission of the Er.

ASE is included in upward signal light λ1 during this amplification. Upward signal light λ1 containing ASE passes from optical amplifier 5 by way of WDM 7 and port 15c of three-port circulation type circulator 15, and circulates within three-port circulation type circulator 15.

When upward signal light λ1 circulates within three-port circulation type circulator 15, ASE is eliminated by first reflecting bandpass filter 9, only the necessary component of 1550 nm wavelength is reflected by first reflecting bandpass filter 9, and upward signal light λ1 is tramsmitted from port 15b. Explanation is next presented regarding transmission of downward signal light λ2.

When downward signal light λ2 having a wavelength of 1555 nm is received from port 15b of three-port circulation type circulator 15, it circulates within three-port circulation type circulator 15, passes from port 15c and is directed to optical amplifier 5 by way of WDM 7.

At this time, exciting light from light source 8 passes through the branched port of WDM 7, this exciting light excites the Er of optical amplifier 5, and downward signal light λ2 is amplified by the stimulated emission of the Er. ASE is included in downward signal light λ2 during this amplification.

Downward signal light λ2 containing ASE is directed from optical amplifier 5 into three-port circulation type circulator 14 by way of WDM 4 and port 14c of three-port circulation type circulator 14, and circulates around this three-port circulation type circulator 14.

During circulation inside three-port circulation type circulator 14, the ASE included in downward signal light λ2 is eliminated by second reflecting bandpass filter 3, and only the 1555 nm wavelength component of downward signal light λ2 is reflected by this second reflecting bandpass filter 3.

As a result, only the necessary signal light, i.e., downward signal light λ2, is transmitted from port 14a. In addition to the effect of the first embodiment, the third embodiment further has the effect of allowing the use of one transmission path because upward signal light λ1 and downward signal light λ2 are inputted or outputted at the same ports.

As described hereinabove, the present invention eliminates unnecessary spontaneous emission light in both upward signal light and downward signal light by means of a reflecting bandpass filter connected to a optical circulator in a following section, thereby allowing transmission of only the necessary signal light.

The present invention therefore enables not only a reduction in the number of optical components, a reduction in insertion loss, and an alleviation of NF deterioration, but also allows a reduction in both size and cost.

While preferred embodiments of the present invention have been described using specific terms, such description is for illustrative purposes only, and it is to be understood that changes and variations may be made without departing from the spirit or scope of the following claims.

What is claimed is:

1. A two-way optical amplifier module, comprising:
   a single optical amplifier including an optical fiber doped with a rare-earth element for amplifying upward signal light and downward signal light;
   a first optical circulator for both transmitting said upward signal light to said optical amplifier and transmitting said downward signal light amplified by said optical amplifier;
   a second optical circulator for both transmitting said downward signal light to said optical amplifier and transmitting said upward signal light amplified by said optical amplifier;
   a first light source for supplying exciting light to said optical amplifier for amplification of said upward signal light;
   a second light source for supplying exciting light to said optical amplifier for amplification of said downward signal light;
   a first reflecting bandpass filter for eliminating ASE (Amplified Spontaneous Emission) during passage of said upward signal light amplified by said optical amplifier through said second optical circulator by reflecting only said upward signal light; and
   a second reflecting bandpass filter for eliminating ASE during passage of said downward signal light amplified by said optical amplifier through said first optical circulator by reflecting only said downward signal light.

2. A two-way optical amplifier module according to claim 1 wherein said first optical circulator and said second optical circulator comprise each a four-port circulation type circulator.

3. A two-way optical amplifier module according to claim 1 wherein said first optical circulator and said second optical circulator each comprise a three-port circulation type circulator.

4. A two-way optical amplifier module according to claim 1 wherein said upward signal light and said downward signal light have differing wavelengths.

5. A two-way optical amplifier module according to claim 1 wherein said first light source supplies exciting light to said optical amplifier through a a third reflecting bandpass filter that reflects said upward signal light to said first optical circulator.

6. A two-way optical amplifier module according to claim 1 wherein said second light source supplies exciting light to said optical amplifier through a a fourth reflecting bandpass filter that reflects said downward signal light to said second optical circulator.

7. A two-way optical amplifier module according to claim 1 wherein a first wavelength division multiplexer is inserted in a section that precedes said optical amplifier for said upward signal light and a second wavelength division multiplexer is inserted in a section that precedes said optical amplifier for said downward signal light.

8. A two-way optical amplifier module according to claim 7 wherein the first wavelength division multiplexer in the section preceding said optical amplifier directs corresponding exciting light from said first light source to said optical amplifier through a branched port of the first wavelength division multiplexor, and said second wavelength division multiplexer in the section preceding said optical amplifier directs exciting light from said second light source to said optical amplifier through a branched port of the second wavelength division multiplexer.

9. The two-way optical amplifier module according to claim 1, wherein a part of said second optical circulator is connected to a first terminal of said first reflecting bandpass filter and a second terminal of said first reflecting bandpass filter has a reflectionless terminator.

10. The two-way optical amplifier module according to claim 1, wherein said first reflecting bandpass filter comprises an optical fiber grating that reflects only a wavelength of 1550 nm.

11. The two-way optical amplifier module according to claim 1, wherein said second reflecting bandpass filter comprises an optical fiber grating that reflects only a wavelength of 1555 nm.

12. The two-way optical amplifier of claim 10 wherein a 0.5 dB signal loss results from said optical fiber grating.

13. The two-way optical amplifier of claim 11 wherein a 0.5 dB signal loss results from said optical fiber grating.

14. A two-way optical amplifier module according to claim 5 wherein said second light source supplies exciting light to said optical amplifier through a reflecting bandpass filter that reflects said downward signal light to said second optical circulator.

15. The two-way optical amplifier according to claim 14 wherein a signal light insertion loss due to said first, second, third, and fourth reflecting bandpass filters is 0.5 dB.

16. The two-way optical signal amplifier according to claim 14 wherein an ASE level is reduced by 30 dB.

17. The two-way optical signal amplifier according to claim 15 wherein an ASE level is reduced by 30 dB.

18. The two-way optical amplifier according to claim 3 wherein each said three-port circulator has a single transmission path for both said upward light and said downward light.

* * * * *